J. P. & H. P. SHEVLIN.
WATER MOTOR.
APPLICATION FILED FEB. 28, 1908.

904,567.

Patented Nov. 24, 1908.
3 SHEETS—SHEET 1.

Witnesses:
G. Sargent Elliott.
Adella M. Fowle

Inventors:
Joseph P. Shevlin.
Henry P. Shevlin.
By H. S. Bailey. Attorney.

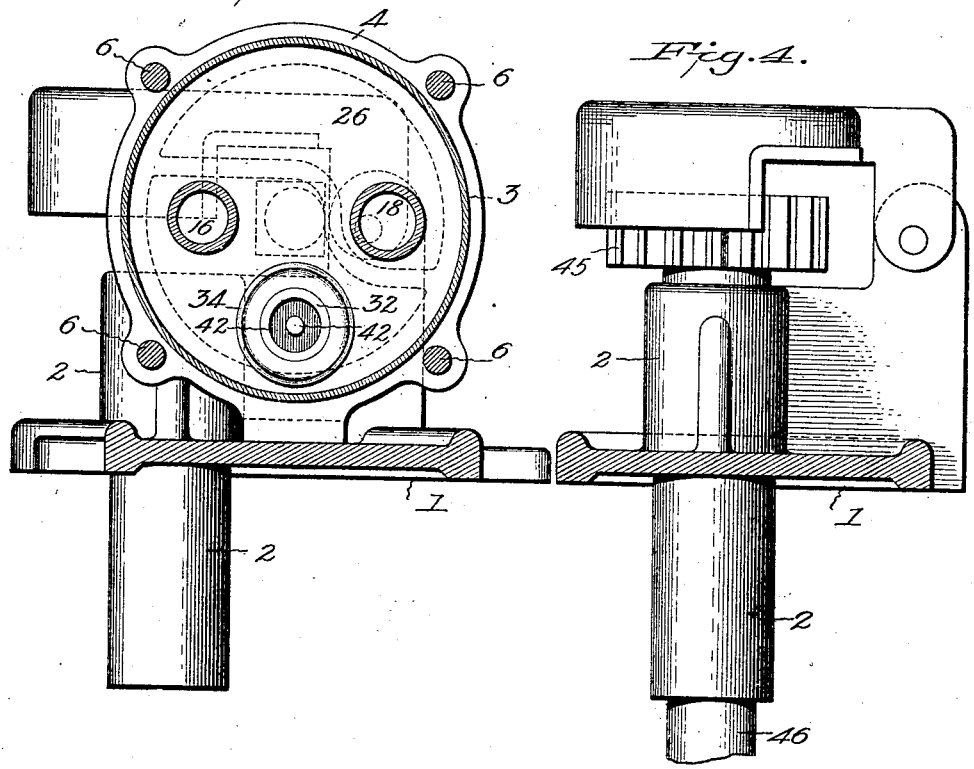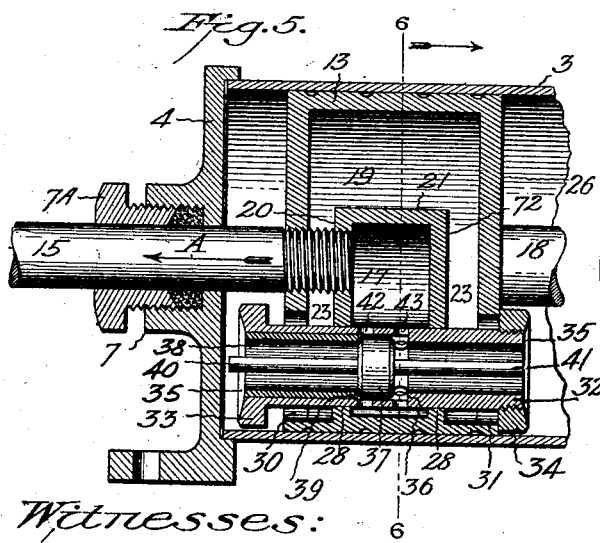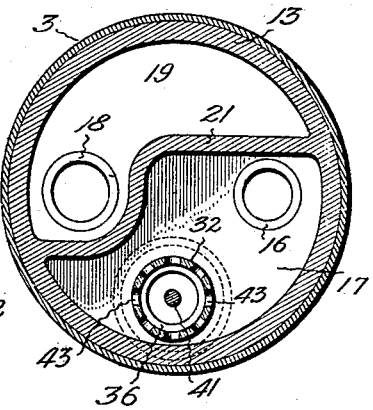

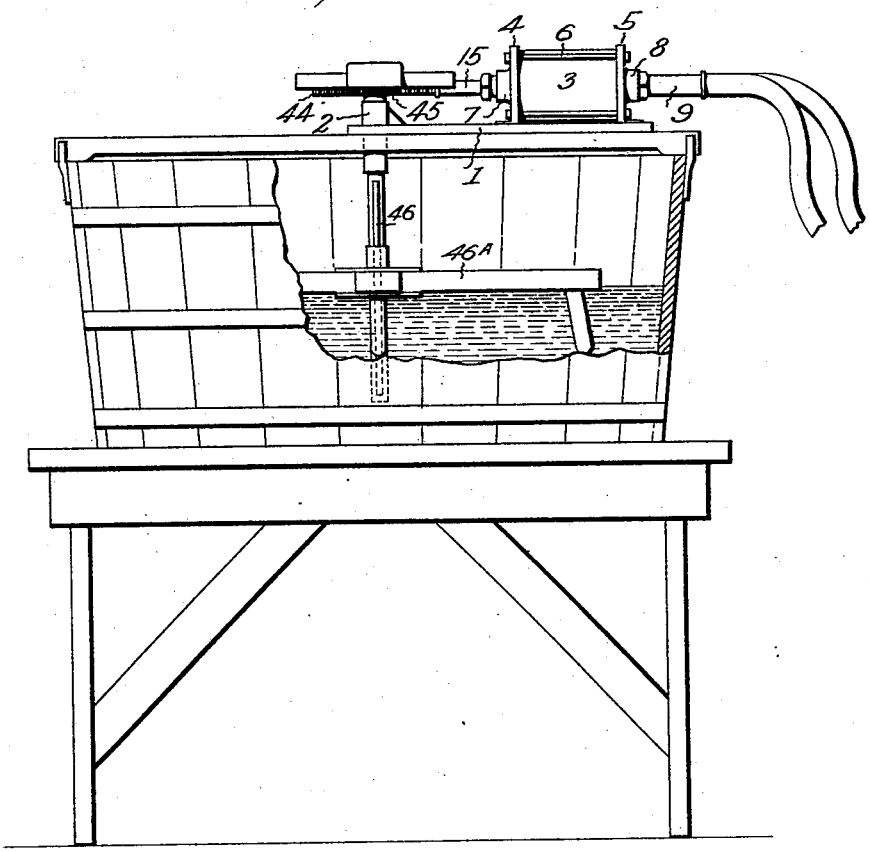

UNITED STATES PATENT OFFICE.

JOSEPH P. SHEVLIN AND HENRY P. SHEVLIN, OF DENVER, COLORADO.

WATER-MOTOR.

No. 904,567.

Specification of Letters Patent.

Patented Nov. 24, 1908.

Application filed February 28, 1908. Serial No. 418,338.

*To all whom it may concern:*

Be it known that we, JOSEPH P. SHEVLIN and HENRY P. SHEVLIN, citizens of the United States of America, residing at the city and county of Denver and State of Colorado, have invented a new and useful Water-Motor, of which the following is a specification.

This invention relates to improvements in water motors.

The object of the invention is to provide a motor of the reciprocating type, which is adapted to be operated by water under the average pressure of city water plants, the motor being connected to a faucet or to a water supply pipe of residences, by which the pressure may be regulated to meet requirements.

A further object of the invention is to provide a motor provided with a single compound valve, which is simple in construction and positively automatic in its action, and which is operated entirely by water pressure, no springs being employed to actuate the inlet and exhaust valves to reverse the pressure of the water.

Figure 1:
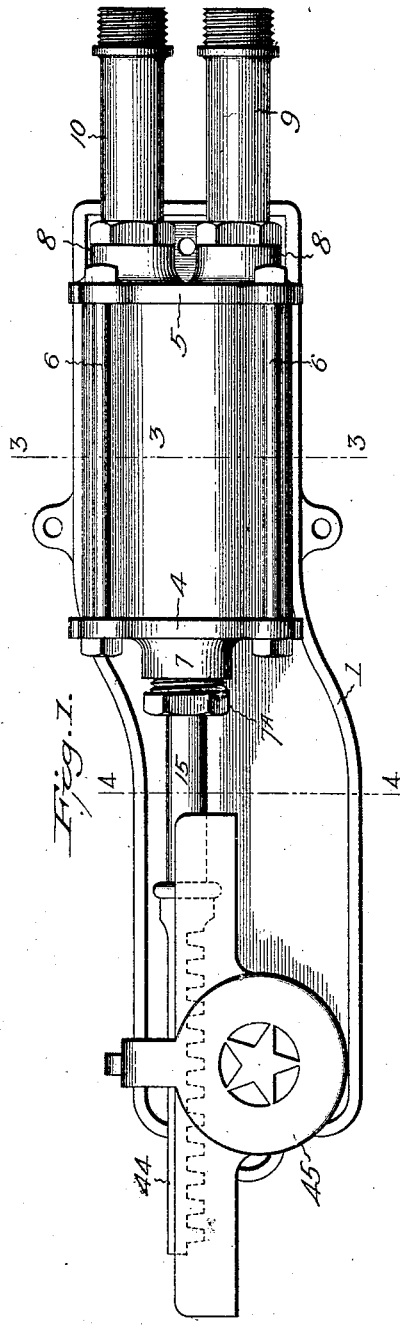
Figure 2:
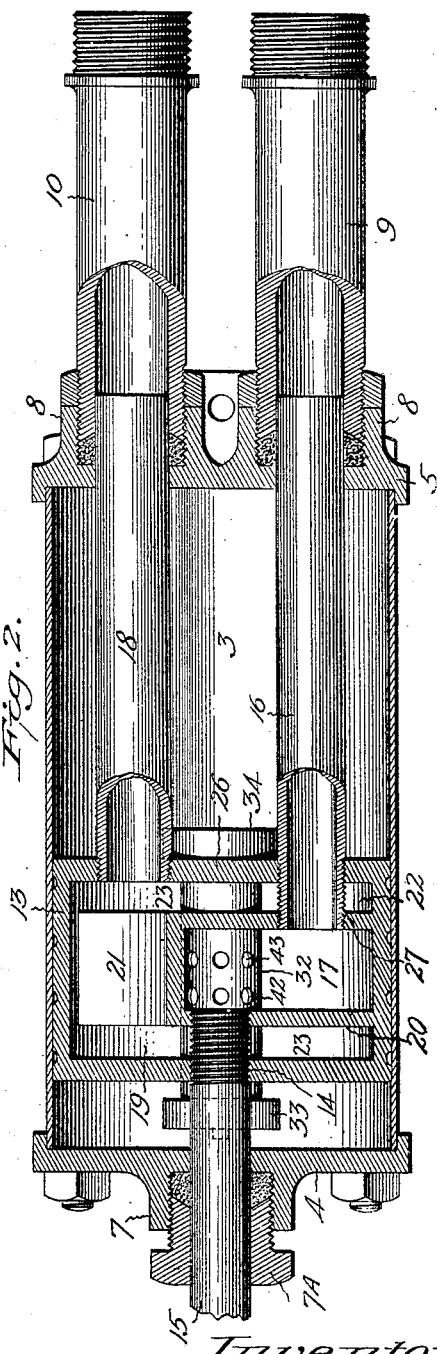

These objects are obtained by the mechanism illustrated in the accompanying drawings, in which:

Figure 1, is a plan view of the improved water motor arranged to operate a washing machine. Fig. 2, is a horizontal, sectional view taken centrally through the cylinder and piston. Fig. 3, is a transverse, vertical, sectional view through the cylinder and the inlet and exhaust tubes, looking towards the piston. Fig. 4, is a vertical, transverse, sectional view through the base plate to which the cylinder is attached, on the line 4—4 of Fig. 1, showing a hinged shield for covering the operating end of the piston rod. Fig. 5, is a vertical, sectional view through the piston and a portion of the cylinder, showing the position of the inlet and exhaust valves, when the piston is moving in the direction of the arrow. Fig. 6, is a sectional view on the line 6—6 of Fig. 5. And Fig. 7, is a side sectional view of a wash tub, showing one of my motors operatively attached to it to wash clothes.

Similar letters of reference refer to similar parts throughout the several views.

Referring to the accompanying drawings, the numeral 1, designates the base plate, to which the motor is bolted, and which is designed to be secured to a fixed support. In the present instance, the motor is adapted for operating a washing machine, and the base plate is provided with an integral hub 2, which extends a suitable distance beyond each side of the plate, at its forward end, to receive the dasher shaft of the washing machine, as shown in Fig. 4. The cylinder 3, of the motor, is closed at each end by heads 4 and 5, which are secured together upon the cylinder by bolts 6. The head 4, is provided with a suitable stuffing box 7, and the head 5, is provided with a pair of stuffing boxes 8, which are on a horizontal line, one on each side of the axial center of the head.

In one of the boxes 8, is screwed a water inlet pipe 9, and in the other box 8, is secured an outlet pipe 10, and these pipes 9 and 10, are threaded at their outer ends to enable them to be connected respectively with a source of supply and with a pipe or hose leading to waste. The piston head 13 of my improved water motor, consists of a single piece of cast metal, cast of the right length and size and of circular form, to be machine finished on its periphery to fit reciprocally in the cylinder. One side of it is provided with a threaded axial bore 14, in which a piston rod 15 is threaded, which extends through the stuffing box 7 and gland 7ᴬ of the front cylinder head 4.

My improved piston head is cast hollow, and is provided with a water inlet aperture pipe 16 and port 17, and also with a water exhaust pipe 18, and an interior water exhaust port 19, and as the piston head is a casting these interior water inlet and exhaust ports are cast within it, the port 17 being formed by partition walls 20, 21, and 22, which are separated from the opposite end walls of the piston head by exhaust port spaces 23, and these walls 20, 21 and 22 form a closed hood portion within the hollow piston head that extends in a semi-circle from one side to the opposite side of the interior of the piston head, and the water inlet pipe 16 extends through and is threaded or otherwise secured to an aperture formed in the end 26 of the piston head, and is threaded into an aperture 27 formed through the wall 22 of the semi-circular hood formed water inlet port 17 of the piston head. The water exhaust pipe 18 is also threaded to the end 26 of the piston head at the opposite side of the center of the piston head in a position to enter the exhaust port 19 of the head. Between these two water pipes and to one side of them, a circular valve seat 28 is formed in the sides 20 and 22 of the water inlet port, and exhaust ports 30 and 31 are formed concentrically with these valve seats and in alinement with them through the opposite side walls of the piston head. A circular tubular stem-shaped form of valve 32, is seated in the circular valve seats 28 of the walls 20 and 22 of the water inlet port 17, to fit snugly but slidably therein, and this valve is made long enough to extend through and a short distance beyond the opposite sides of the piston head, and the ends of the stem portion of this valve are provided with disk-shaped heads 33 and 34, that are a little larger in diameter than the exhaust ports 30 and 31, and are adapted to bear against the opposite ends of the piston head as the ends of the valve alternately contact with the cylinder heads at the ends of the reciprocal strokes of the piston, as will be explained more fully hereinafter. The outer side surfaces of these disks, are counterbored or hollowed out slightly from close to the outer rim portion so as to form a ring seat portion 35 of the full diameter of the disks, which is adapted to engage and seat against the opposite cylinder heads 4 and 5 of the cylinder at the ends of the reciprocal strokes of the piston head. In constructing the valve 32, one of the disks is preferably made integral with the tubular stem portion, and the other disk is made separate from the tubular stem and is threaded to the opposite end, after it is put in the circular seats 28, and is secured to the threaded end against accidental displacement by any suitable means, preferably by solder. This valve 32 consists of a tube, which is counterbored for approximately a half of its length, the counterbored portion terminating in an abrupt shoulder 36, and within this counterbored portion is housed a double acting plug valve 37, which has a limited longitudinal movement in the valve. To secure the plug valve within the valve 32, a sleeve 38 is inserted within the counterbore and brazed or otherwise secured therein.
The inner end of the sleeve forms a shoulder 39, similar to the shoulder 36, and the space between these shoulders is slightly greater than the length of the plug valve 37, so that as it is shifted in its housing, it will be limited in its movement by one or the other of the shoulders.

Stems 40 and 41, project from the ends of the plug valve through the bore of the valve 32, and these stems are of such length that one or the other of them according to the position of the plug valve, will always extend slightly beyond the end of the valve 32. Circular rows of holes or ports 42 and 43, extend from the plug valve chamber or housing, through the periphery of the valve 32, and these ports communicate with the inlet chamber 17 at all times. These ports 42 and 43 are spaced at such a distance apart relatively to the length of the plug valve, that when the said valve is at the limit of its movement in either direction, within the valve 32, one row of ports will be entirely uncovered, and will form a means of communication between the inlet chamber 17 and the cylinder, while the other row of ports will be covered, and the plug valve will be seated against the shoulder adjacent to the closed row of ports, and the valve stem projecting from the seated side of the plug valve will project slightly beyond the adjacent end of the valve 32.

The water inlet pipe 16 and the exhaust pipe 18 extend through the cylinder head 5, into the guide pipes 9 and 10, in which they are reciprocally mounted. The outer end of the piston is connected to a toothed rack bar 44, which engages a pinion 45 that is secured to the upper end of a vertical shaft 46, that is journaled in the hub 2, formed on the bed plate 1, which is adapted to be secured to the top of a wash tub or to any machine that it is proposed to operate by the motor. The shaft projects through and below the hub 2, and in case the motor is used on a wash tub the lower end of the shaft 46 is rigidly connected to a dasher 46ª, which is oscillated in the tub, as the piston head is reciprocated in the cylinder by the water pressure.

The operation of the piston head and of its valve is as follows: Water under pressure enters the inlet pipe 9, and passes through the tube 16 into the chamber 17 of the piston, and, assuming that the piston is traveling in the direction of the arrow A, Fig. 5, the valves 32 and 37 will be in the position shown in the above mentioned figure, having assumed these positions through the contact of the valves with the cylinder head 5, and the pressure of water upon them immediately prior to their start in the direction of the arrow A. With the valves in this position, the water entering the chamber 17 passes through the ports 43, and through the adjacent end of the valve 32, into the cylinder, moving the piston in the direction indicated, the other outlet end of the valve 32 being closed by the seating of the valve 37 upon the seat 39. As the piston moves forward, the exhaust water in front of it passes through the port 30 in the forward piston head, and into the chamber 19, whence it passes through the tube 18 and pipe 10 to waste.

By reference to Fig. 5, it will be seen that the plug valve stem 40 projects slightly beyond the adjacent end of the valve 32; thus, when the piston reaches the end of the cylinder, this stem 40 will contact with the cylinder head 4, before the valve 32 contacts.

The contact of the stem 40 with the cylinder head, moves the valve 37 away from its seat 39, and the water in the chamber 17 now flows through the circular row of ports 42 into the forward end of the valve 32, which immediately contacts with the cylinder head, and the pressure in the valve between the head and the plug valve throws the latter against the shoulder or seat 36, cutting off the pressure from the rear end of the cylinder. By contact with the cylinder head 4, the valve 32 is moved so that the disk 34 is unseated from the port 31, when the pressure on the forward end of the valve moves it rearward in its seat until its disk 33 contacts with the forward piston head and closes the exhaust port 30, while the opposite disk 34 opens the exhaust port in the rear piston head. The water passing through the ports 42 and into the forward end of the valve 32, and the concave face of the disk 33, exerts a pressure upon the cylinder head 4, and starts the piston in the opposite direction, and the same movement of the valves in a reverse direction is effected by their contacts with the cylinder head 5.

Having described the invention, what is claimed as new and desired to be secured by Letters Patent, is:

1. In a water motor, the combination of a cylinder having heads secured thereto, one of which has an axial hole surrounded by a packing box, while the other head has a hole on each side of its axial center surrounded by a packing box; a piston head in the cylinder, having a water inlet port and an exhaust outlet port separated from each other by partitions, a piston rod extending through the axial aperture in one of the piston heads and secured to the piston; water inlet and exhaust tubes connecting respectively with the inlet and exhaust ports of the piston, and extending through the apertures of the other cylinder head; and a combined tubular and stem valve reciprocally mounted in said piston head and extending entirely through said piston head and through both of said water inlet and exhaust ports, said combined tubular and stem valve being arranged to contact with the cylinder heads upon each stroke of the piston; and hose connecting guide pipes connected to and extending from the packing boxes of the water inlet and exhaust tubes, in which said water inlet and exhaust tubes slide.

2. In a water motor, the combination with a cylinder having heads, of a piston head therein having a water inlet and an exhaust outlet chamber form of ports separated by suitable partition walls; parallel water inlet and exhaust tubes connecting respectively with the water inlet and exhaust chambers and extending through one of the cylinder heads; packing boxes on said head surrounding the tubes, and pipes in said boxes in which said tubes slide, which are adapted to be connected respectively with a source of supply and with a pipe leading to waste; a compound slide valve in the piston head extending through said inlet and exhaust ports, for admitting water to and exhausting water from said cylinder, said valve comprising a tubular valve having a stem valve within it, said valves being adapted to contact with said cylinder heads on each stroke of the piston head, and being arranged so that the stem valve strikes the cylinder heads prior to said tubular valve to reverse the direction of the flow of water from said water inlet valve through said tubular valve to the opposite ends of said piston head, a piston rod connected to the piston and extending through the opposite head from the inlet and exhaust tubes, and a packing box surrounding the rod.

3. In a water motor, the combination with a cylinder provided with cylinder heads, of a hollow piston therein, having an inlet and an exhaust port separated from each other by partitions, tubes extending from one end of said piston through one of the cylinder heads, and pipes secured to said head in which the tubes slide, said tubes communicating respectively with the inlet and exhaust chambers; a hollow cylindrical slide valve extending through and slightly beyond said piston head and comprising a tube having two circular rows of radially disposed holes extending through its shell, the ends of said valve projecting through the opposite sides of said piston head; a disk-shaped head on the opposite ends of said valve; a stem valve slidably mounted in said tubular valve to control said circular rows of port holes, and adapted to engage the opposite cylinder heads of said cylinder and alternately open and close the radial ports through said tubular valve at the ends of the opposite strokes of said piston head; and a piston rod secured to the opposite end of the piston from the said tubes, and extending through the adjacent cylinder head.

4. In a water motor, the combination with a headed cylinder having inlet and exhaust pipes in one end thereof, of a piston head in said cylinder provided with an inlet and an exhaust port, separated from each other by partitions, inlet and exhaust tubes connecting respectively with said inlet and exhaust chambers through one end of said piston, and extending into said inlet and exhaust pipes in sliding engagement therewith; a tubular cylindrical slide valve in the piston head's inlet and outlet ports, which projects through port openings in the opposite ends of the piston head so as to contact with the cylinder heads; and means for limiting the movement of said valve in either direction; two circular rows of radially disposed port holes through the central portion of said valve positioned within said inlet port, and a disk valve in said tubular valve provided with valve stems which project from its opposite ends and extend through and slightly beyond the opposite ends of said tubular valve, and arranged to close and to open said circular rows of port holes in said hollow valve in alternate order, the stems of said disk valve and the opposite ends of said tubular valve being adapted to engage said cylinder heads at the ends of the reciprocal strokes of said piston head and operatively admit water to the opposite ends of said piston head in alternate order; and a piston rod connected to the opposite end of the piston head from the inlet and exhaust tubes.

5. In a water motor, the combination with a closed cylinder, of a hollow piston having an interior water inlet and an exhaust port separated from one another by suitable partitions, a tubular cylindrical water inlet valve slidably supported in seats formed in said water inlet port, exhaust inlet ports in the opposite end walls of said piston head in alinement with said valve seats and larger than the body of said tubular valve, said tubular valve extending through and beyond the opposite side walls of said piston head, a disk portion on the opposite ends of said valve of enough larger diameter than the tubular portion of said valve to bear on the ends of said piston head around said exhaust ports, a counterbore in the outer side of each disk extending from its central portion to close to its outer rim portion, said tubular valve being provided at its central portion with two circular rows of radially disposed ports arranged wholly within said water inlet port and between its side walls; a disk valve in the interior of said tubular valve provided with stems on its opposite ends which extend through and slightly beyond the disk portions of said tubular valve and adapted to engage the cylinder heads of said cylinder at the ends of the reciprocal strokes of said piston head, said disk valve being arranged to cover in alternate order said two rows of port holes, the disk portions of said tubular valve being adapted to engage the cylinder heads of said cylinder after said disk valve has been moved by them to change the direction of flow of the water through said tubular valve; inlet and exhaust tubes extending respectively from the inlet and exhaust chambers through one of the piston heads; and a piston rod connected to said piston.

6. In a water motor, the combination with a closed cylinder, a piston having a water inlet chamber or port and an exhaust outlet chamber or port, and inlet and exhaust tubes leading from said chambers through one of the cylinder heads, of a water inlet tubular reciprocating valve in the water inlet chamber, which projects across the exhaust chamber and through exhaust entrance ports formed in the opposite end wall of said piston head, said exhaust inlet ports being of larger diameter than said tubular valve; a disk valve within said tubular valve provided with stem portions projecting from its opposite ends through and beyond the ends of said tubular valve, and adapted to engage the opposite cylinder heads of said cylinder as the piston reciprocates therein, said tubular valve being provided with two rows of ports extending through its shell within said water inlet port and arranged at a short distance apart, and to be controlled by said disk valve in alternate order to admit water to the opposite ends of said tubular valve and of said piston head in alternate order at the ends of said piston head's reciprocal strokes; disk portions on said tubular valve arranged to engage the cylinder heads at the ends of the piston head's strokes, and to seat against the opposite ends of said piston head and close said exhaust ports; a piston rod secured to the piston and extending through the adjacent cylinder head; and pipes connected to the other cylinder head, in which the inlet and exhaust tubes slide.

7. In a water motor, the combination with a cylinder and a piston head having a water inlet and exhaust chambers, and water inlet and exhaust tubes leading from said chambers through one end of the cylinder, of a tubular slide valve in the exhaust chamber adapted to contact with the ends of the cylinder as the piston reciprocates, and to alternately close said exhaust ports, a valve within said tubular valve provided with stem portions at its opposite ends that extend through and beyond said tubular valve, and to engage said cylinder heads a trifle in advance of the engagement therewith of said tubular valve; water inlet ports through the shell of said tubular valve at each side of its central portion arranged to be controlled by said stem actuated valve and registering with said water inlet port, and a piston rod on said piston head provided with a gear toothed bar.

8. In a water motor, the combination of the cylinder and cylinder heads, with the piston head having a water inlet and an exhaust port, said water inlet port being located in the central portion of said piston head, and said exhaust port surrounding the sides of said inlet port; a valve seat through said inlet port; exhaust entrance ports through the opposite ends of said piston head in alinement with said valve seat; a tubular slide valve in said inlet port valve seat extending through the exhaust ports of said piston head and beyond the opposite ends of said piston head, and provided with enlarged end portions adapted to engage the cylinder heads at the ends of the reciprocal strokes of said piston head, with their outside ends, and to seat against the ends of said piston head around said exhaust ports, said enlarged end portions being provided with a seat portion and a recess within said seat portion, said valve being also provided with two rows of radially disposed ports positioned at a short distance apart at its central portion within said water inlet port; a disk valve in the central portion of said tubular valve, arranged to control said two rows of radial ports, and provided with stems extending from its opposite sides through and slightly beyond the opposite ends of said tubular valve and adapted to engage said cylinder head prior to the engagement therewith of the ends of said tubular valve, and move said disk valve to admit water pressure from said inlet port into said tubular valve and to the opposite ends of said piston head and of said cylinder in alternate order at the ends of said piston's reciprocal strokes; a piston rod connected to one end of the piston inlet and exhaust tubes connected respectively with inlet and exhaust piston chambers, and extending from one end of the piston through the adjacent cylinder head; pipes in the cylinder head in which the tubes slide as the piston reciprocates, said pipes being adapted to connect respectively with a source of pressure and with waste; a gear toothed bar connected to the outer end of said piston rod; and a pinion operatively supported in mesh with said piston rod's gear toothed bar.

In testimony whereof we affix our signatures in presence of two witnesses.

JOSEPH P. SHEVLIN.
HENRY P. SHEVLIN.

Witnesses:
   G. SARGENT ELLIOTT,
   ADELLA M. FOWLE.